United States Patent [19]
Ji et al.

[11] Patent Number: 5,636,070
[45] Date of Patent: Jun. 3, 1997

[54] THIN FILM ACTUATED MIRROR ARRAY

[75] Inventors: Jeong-Beom Ji; Dong-Kuk Kim, both of Seoul, Rep. of Korea

[73] Assignee: Daewoo Electronics Co, LTD., Seoul, Rep. of Korea

[21] Appl. No.: 430,628

[22] Filed: Apr. 28, 1995

[30] Foreign Application Priority Data

Apr. 30, 1994 [KR] Rep. of Korea .................... 94-9506
Jun. 30, 1994 [KR] Rep. of Korea .................... 94-15342

[51] Int. Cl.$^6$ .............. G02B 5/08; G02B 7/182; H04R 17/00
[52] U.S. Cl. ............ 359/855; 359/290; 359/295; 359/297; 359/224; 310/328; 310/366; 29/25.35
[58] Field of Search .................. 310/328, 366; 29/25.35; 359/224, 225, 291, 295, 855, 900, 290, 297

[56] References Cited

U.S. PATENT DOCUMENTS

| | | | |
|---|---|---|---|
| 5,159,225 | 10/1992 | Um | 310/328 |
| 5,469,302 | 11/1995 | Lim | 359/846 |
| 5,481,396 | 1/1996 | Ji et al. | 359/295 |
| 5,505,807 | 4/1996 | Min et al. | 156/230 |
| 5,506,720 | 4/1996 | Yoon | 359/224 |

*Primary Examiner*—Timothy P. Callahan
*Assistant Examiner*—Eunja Shin
*Attorney, Agent, or Firm*—Anderson Kill & Olick P.C.

[57] ABSTRACT

A method for forming an array of M×N thin film actuated mirrors for use in an optical projection system comprises the steps of: (a) forming a sacrificial layer on top of an active matrix; (b) forming an array of M×N supporting members on the sacrificial layer; (c) depositing an elastic layer; (d) forming M×N conduits; (e) depositing a second thin film layer; (f) forming an electrodisplacive layer; (g) patterning the elastic layer, the second layer and the electrodisplacive layer to form an array of M×N semifinished actuated mirror structures; (h) heat treating the array of M×N semifinished actuated mirror structures; (i) depositing a first thin film layer on each of the semifinished actuated mirror structures to form an array of M×N actuated mirror structures; (j) covering each of the actuated mirror structures with a protection layer; and (k) removing the protection layer and the sacrificial layer to thereby form said array of M×N thin film actuated mirrors.

8 Claims, 9 Drawing Sheets

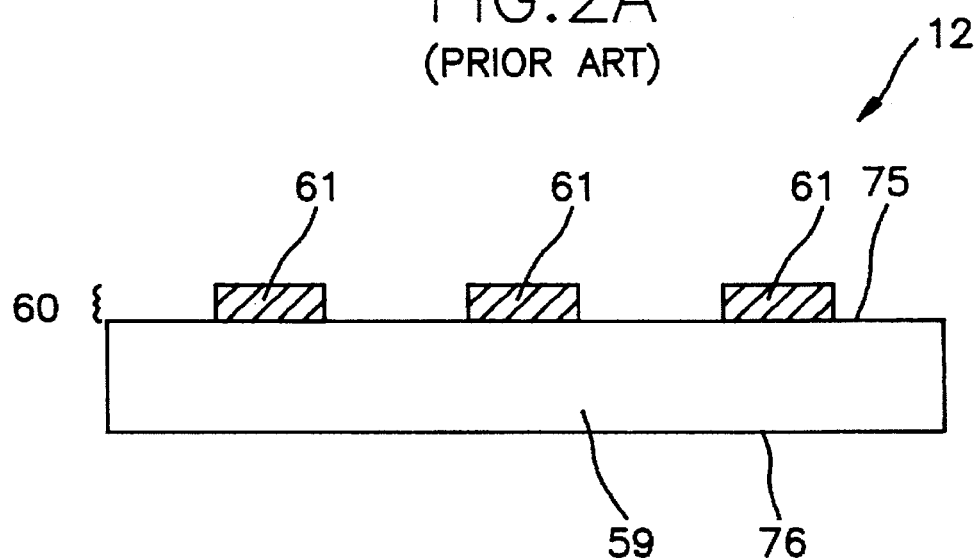
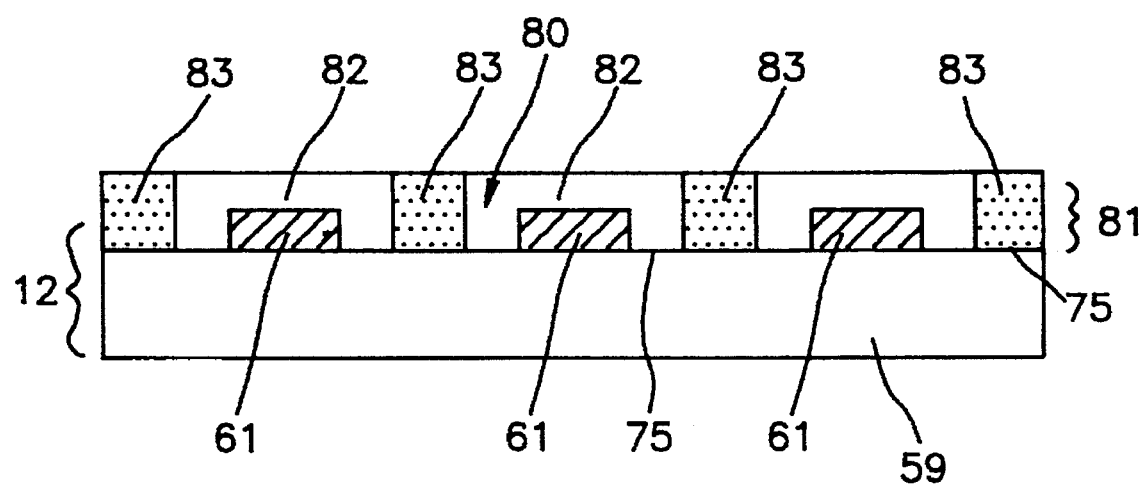

THIN FILM ACTUATED MIRROR ARRAY

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1 and 2A to 2F, there are shown a cross sectional view of an array 10 of M×N thin film actuated mirrors 11, wherein M and N are integers, comprising an active matrix 12, an array 13 of M×N thin film actuating structures 14, an array 15 of M×N supporting members 16 and an array 17 of M×N mirrors 18, and schematic cross sectional views setting forth the manufacturing steps therefor, respectively, disclosed in a commonly owned application, U.S. Ser. No. 08/331,399, entitled "THIN FILM ACTUATED MIRROR ARRAY AND METHOD FOR THE MANUFACTURE THEREOF".

The process for manufacturing the array 10 of M×N thin film actuated mirrors 11 begins with the preparation of the active matrix 12, having a top and a bottom surfaces 75, 76, comprising a substrate 59, an array of M×N transistors (not shown) and an array 60 of M×N connecting terminals 61, as illustrated in FIG. 2A.

In the subsequent step, there is formed on the top surface 75 of the active matrix 12 a supporting layer 80, including an array 81 of M×N pedestals 82 corresponding to the array 15 of M×N supporting members 16 and a sacrificial area 83, wherein the supporting layer 80 is formed by: depositing a sacrificial layer (not shown) on the entirety of the top surface 75 of the active matrix 12; forming an array of M×N empty slots (not shown), to thereby generated the sacrificial area 83, each of the empty slots being located around each of the M×N connecting terminals 61; and providing a pedestal 82 in each of the empty slots, as shown in FIG. 2B. The sacrificial layer is formed by using a sputtering method, the array of empty slots, using an etching method, and the pedestals, using a sputtering or a chemical vapor deposition (CVD) method, followed by an etching method. The sacrificial area 83 of the supporting layer 80 is then treated so as to be removable later using an etching method or the application of chemicals.

A conduit 73 is formed in each of the pedestals 82 by first creating a hole extending from top thereof to top of the corresponding connecting terminals 61 using an etching method, followed by filling therein with an electrically conducting material, as depicted in FIG. 2C.

In the subsequent step, as depicted in FIG. 2D, a first thin film electrode layer 84, made of an electrically conducting material, e.g., Au, is deposited on the supporting layer 80. Thereafter, a thin film electrodisplacive layer 85, made of an electrodisplacive material, e.g., PZT, and a second thin film electrode layer 95 are then respectively formed on the first thin film electrode layer 84. Each of the conduits 73 is used for electrically connecting each of the connecting terminals 61 with the first electrode layer 84 in each of the thin film actuated mirrors 11. The structure shown in FIG. 2D is, then, heat treated to allow a phase transition to take place in the thin film electrodisplacive layer 85.

Subsequently, a thin film layer 99, made of a light reflecting material, e.g., Al, is provided on top of the second electrode layer 95.

The thin film layers of the electrically conducting, the electrodisplacive, and the light reflecting materials may be deposited and patterned with the known thin film techniques, such as sputtering, sol-gel, evaporation, etching and micro-machining, as shown in FIG. 2E.

The sacrificial area 83 of the supporting layer 80 is then removed or dissolved by the application of chemical to thereby form said array 10 of M×N thin film actuated mirrors 11, as illustrated in FIG. 2F.

In the above described methods for manufacturing the array 10 of M×N thin film actuated mirrors 11, an additional process for forming an elastic layer can be added, involving a similar process as in the forming of other thin film layers.

There are a number of problems associated with the above-described method for forming the array 10 of M×N thin film actuated mirrors. The first and foremost to be mentioned is a build up of stress in the thin film electrodisplacive layer during the heat treatment as a result of each of the thin film layers in the thin film actuating structures 14 having a different thermal expansion coefficient. The build up of stress will cause defects, e.g., cracks or hillocks, to be formed on the thin film electrodisplacive layer 85 in each of the thin film actuated mirrors 11, which will in turn, affect the performance thereof, and, hence, the performance of the array 10.

Furthermore, the chemical or the etchant used in the removal of the sacrificial area 83 of the supporting layer 80 in each of the actuated mirrors 11 might chemically attack other thin film layers, degrading the structural integrety of each of the thin film actuated mirrors 11 which will, in turn, affect the performance thereof, and hence, the performance of the array 10.

SUMMARY OF THE INVENTION

It is, therefore, a primary object of the present invention to provide a method for forming an array of M×N thin film actuated mirrors which minimizes the defects in the thin film electrodisplacive layer in each of the actuated mirrors resulting from the build of stress therein during the heat treatment as a consequence of each of the thin film layers in each of the actuated mirrors having a different thermal expansion coefficient.

It is another object of the present invention to provide a method for forming an array of M×N thin film actuated mirrors which minimizes the chemical attacks on the thin film layers in each of the actuated mirrors during the removal of the sacrificial area of the supporting layer.

In accordance with one aspect of the present invention, there is provided a method for manufacturing said array of M×N thin film actuated mirrors, said method comprising the steps of: (a) providing an active matrix having a top surface, the active matrix including a substrate, an array of M×N transistors, an array of M×N pairs of connecting terminals on the top surface thereof and a conduction line pattern; (b) forming a sacrificial layer on the top surface of the active matrix in such a way that the sacrificial layer completely covers the array of M×N pairs of connecting terminals; (c) removing portions of the sacrificial layer surrounding each pair of the connecting terminals; (d) forming a supporting member around each of connecting terminals by filling the portions with an insulating material; (e) depositing an elastic layer, made of an insulating material, on top of the sacrificial layer including the supporting members; (f) forming a conduit in each of the supporting members, each of the conduits extending from top of the elastic layer to each of the connecting terminals, wherein the conduit is connected electrically to the transistor; (g) depositing a second thin film layer made of an electrically conducting material on top of the elastic layer; (h) forming an electrodisplacive layer on top of the second thin film layer to thereby form a semifinished actuating structure; (i) patterning the elastic layer, the second layer and the electrodisplacive of the semifinished actuating structure until the sacrificial layer is exposed to thereby form an array of M×N semifinished actuated mirror structures, wherein each of the semifinished actuated mirror structures includes an electrodisplacive layer, a second electrode layer and an elastic member; (j) heat treating the array of M×N semifinished actuated mirror structures to thereby force a phase transition to take place in the electrodisplacive layer in each of the semifinished actuated mirror structures; (k) depositing a first thin film layer made of an electrically conducting and light reflecting material on each of the semifinished actuated mirror structures to form an array of M×N actuated mirror structures, wherein each of the actuated mirror structures includes a top and four side surfaces; (l) covering completely each of the actuated mirror structures with a thin film protection layer to thereby form an array of M×N protected actuated mirror structures; (m) removing the thin film protection layer on the four side surfaces in each of the protected actuated mirror structures and the sacrificial layer to thereby form said array of M×N thin film actuated mirrors.

BRIEF DESCRIPTION OF THE DRAWINGS

The above and other objected and features of the present invention well become apparent from the following description of preferred embodiments given in conjunction with the accompanying drawings, wherein:

FIGS. 2(A) to 2(F) reproduce schematic cross sectional views setting forth the manufacturing steps for the array shown in FIG. 1.

DETAILED DESCRIPTION OF THE PREFERRED EMBODIMENTS

Figure 1:
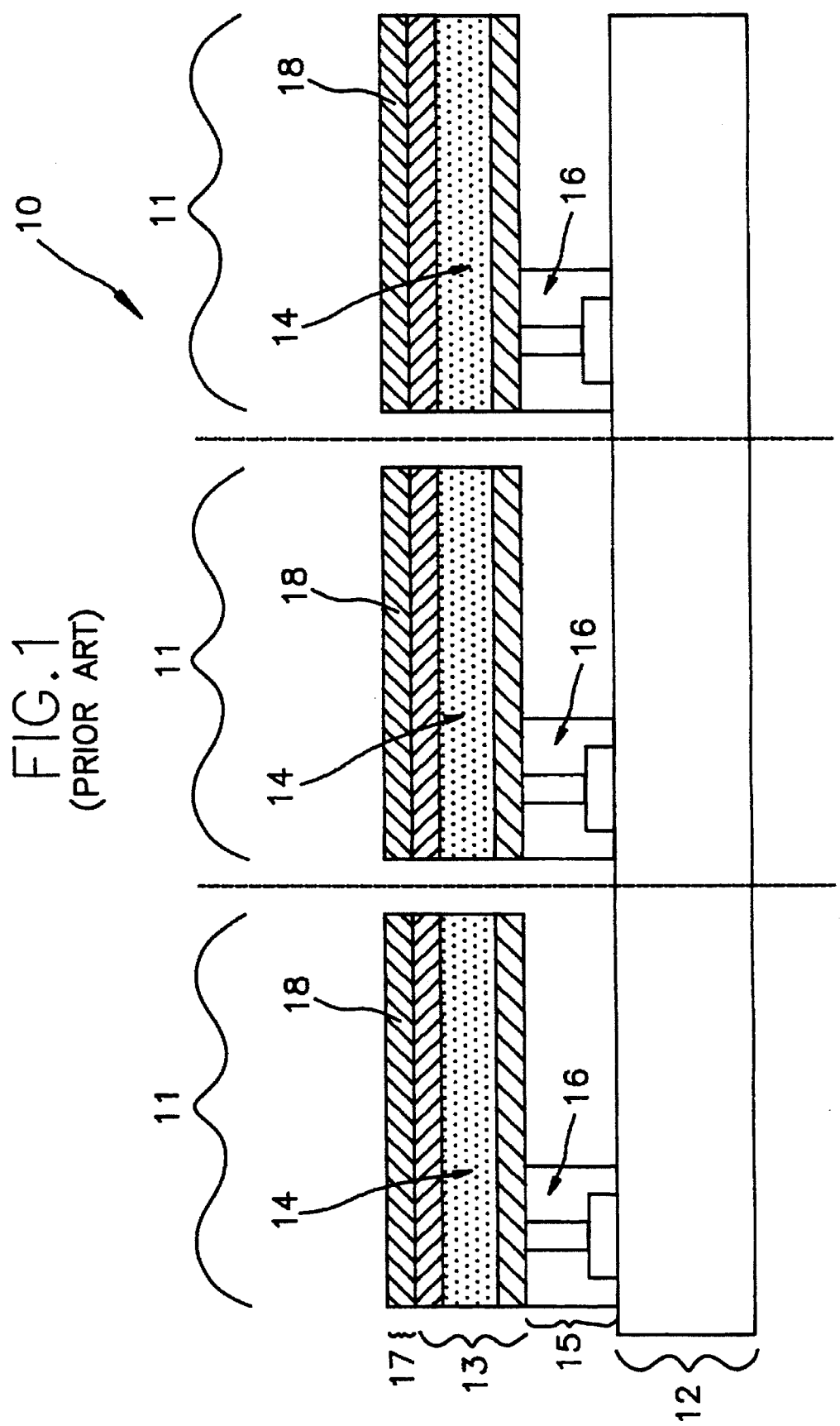
FIG. 1 shows a cross sectional view of an array of M×N thin film actuated mirrors previously disclosed.
Figure 2C:
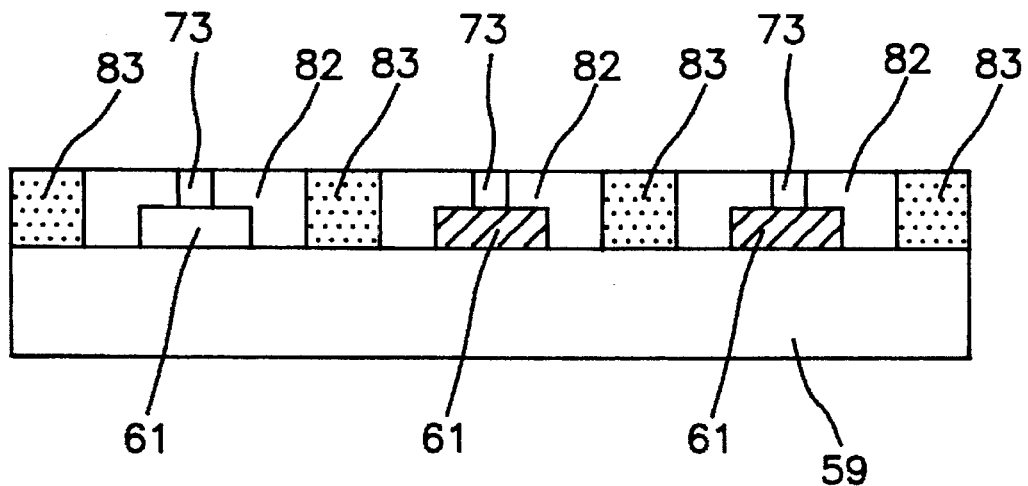
Figure 2D:
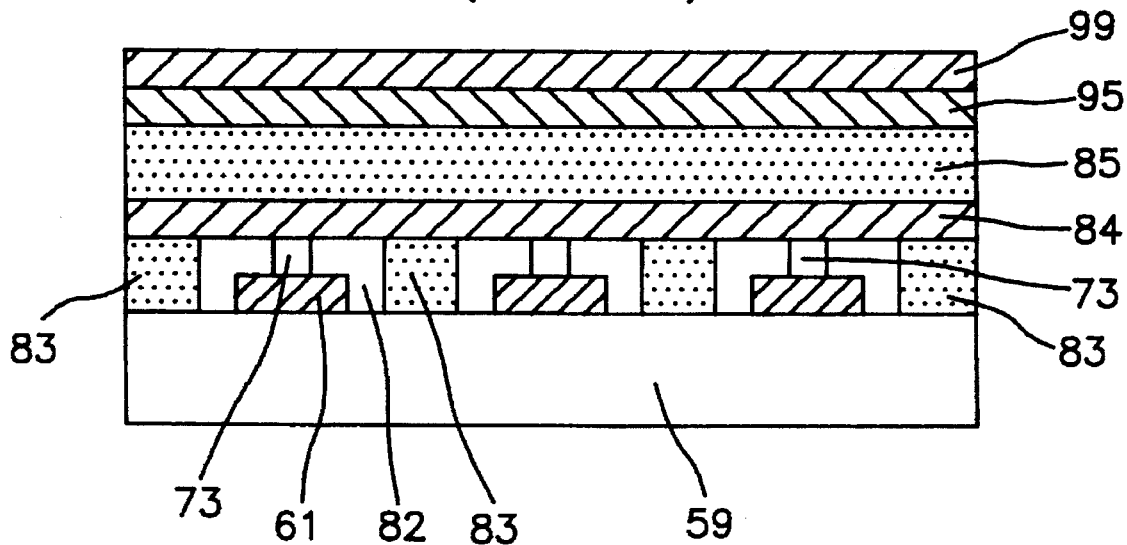
Figure 2E:
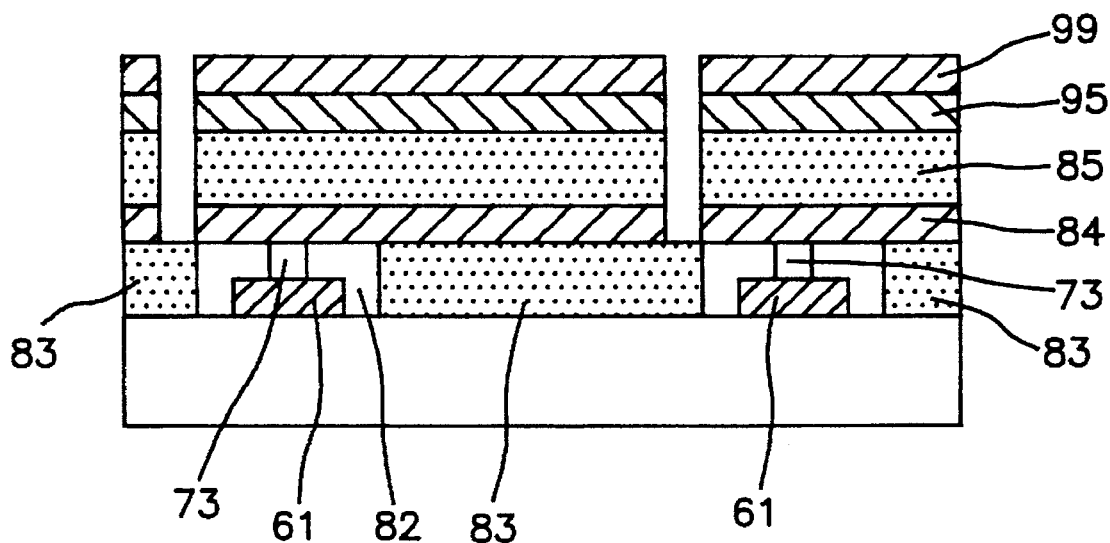
Figure 2F:
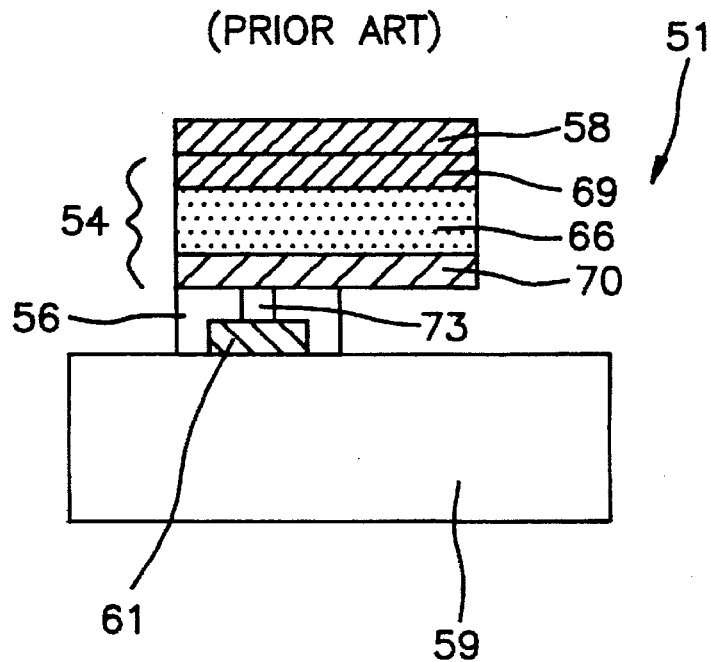
Figure 3A:
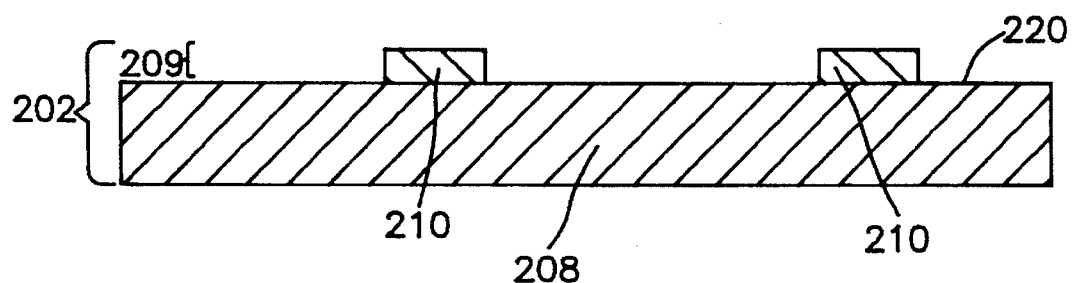
FIGS. 3(A) to 3(J) illustrate schematic cross sectional views setting forth the inventive manufacturing steps for an array of M×N thin film actuated mirrors in accordance with the present invention.

There are illustrated in FIGS. 3A to 3J the inventive manufacturing steps involved in manufacturing an array 200 of M×N thin film actuated mirrors 201. The process for manufacturing the array 200 begins with the preparation of the active matrix 202 having a top surface 220, comprising the substrate 208, the array of M×N transistors (not shown), the conduction line pattern (not shown), and the array 209 of M×N connecting terminals 210, as shown in FIG. 3A.

Figure 3B:
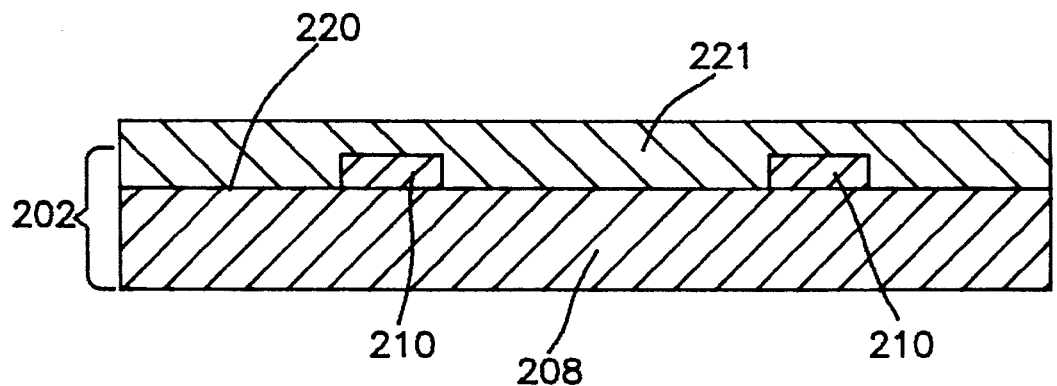

In the subsequent step, there is formed on the top surface 220 of the active matrix 202 a sacrificial layer 221 having a thickness of 1~2 μm and made of a metal, e.g., copper (Cu) or nickel (Ni), a phosphor-silicate glass (PSG) or poly-Si, by using a sputtering method if the sacrificial layer 221 is made of a metal, a chemical vapor deposition (CVD) method or a spin coating if the sacrificial layer 221 is made of a PSG, and a CVD method if the sacrificial layer is made of poly-Si, as illustrated in FIG. 3B.

Figure 3C:
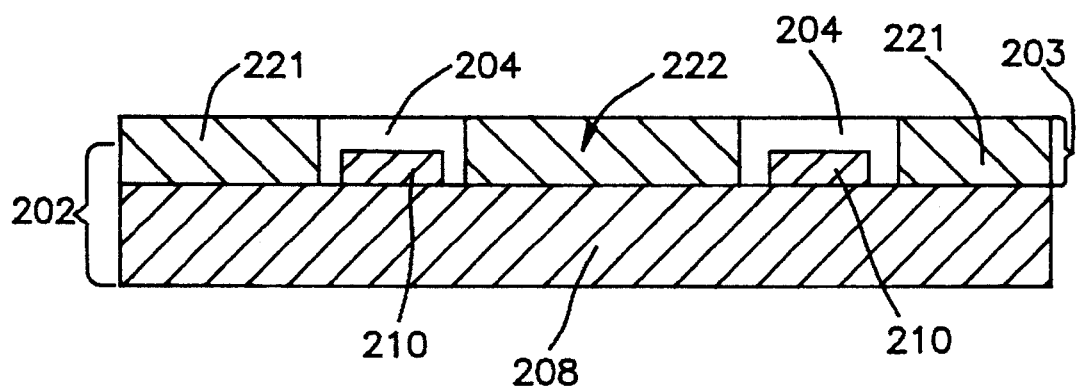

Subsequently, there is formed a first supporting layer 222 including the array 203 of M×N supporting members 204 and the sacrificial layer 221, wherein the first supporting layer 222 is formed by: creating an array of M×N empty slots (not shown) using a photolithography method, each of the empty slots being located around each of the connecting terminals 210; and forming a supporting member 204, made of an insulating material, e.g., silicon nitride ($Si_3N_4$), in each of the empty slots located around each of the connecting terminals 220, using a sputtering method or a CVD method, as shown in FIG. 3C.

In the following step, an elastic layer 105, made of a insulating material, e.g., silicon oxide ($SiO_2$), is formed on top of the sacrificial layer 221 including the supporting members 204.

Figure 3D:
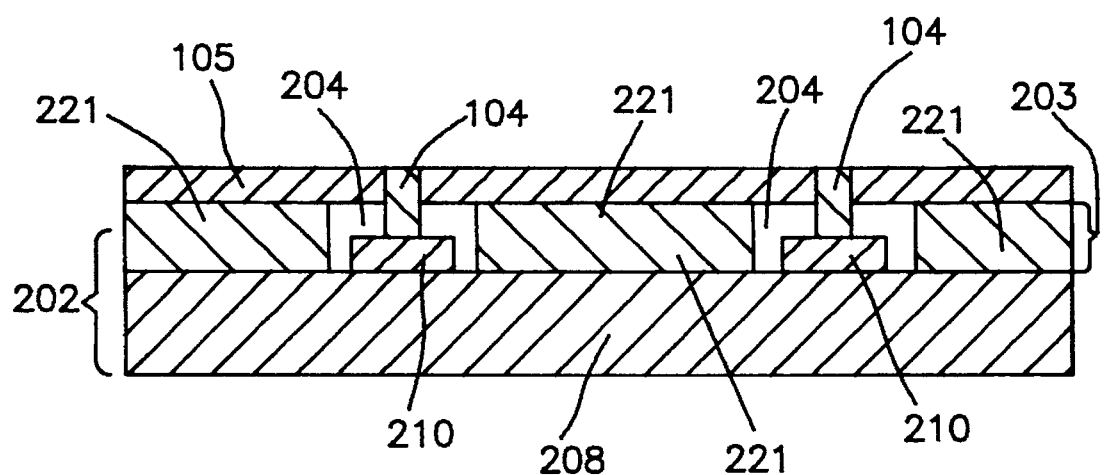

Thereafter, a conduit 104, made of a metal, e.g., W, is formed in each of the supporting members 204 by: first creating a hole, the hole extending from top of the elastic layer 105 to, top of the corresponding connecting terminal 210, using an etching method; and filling therein with a metal, e.g., W, as depicted in FIG. 3D.

Figure 3E:
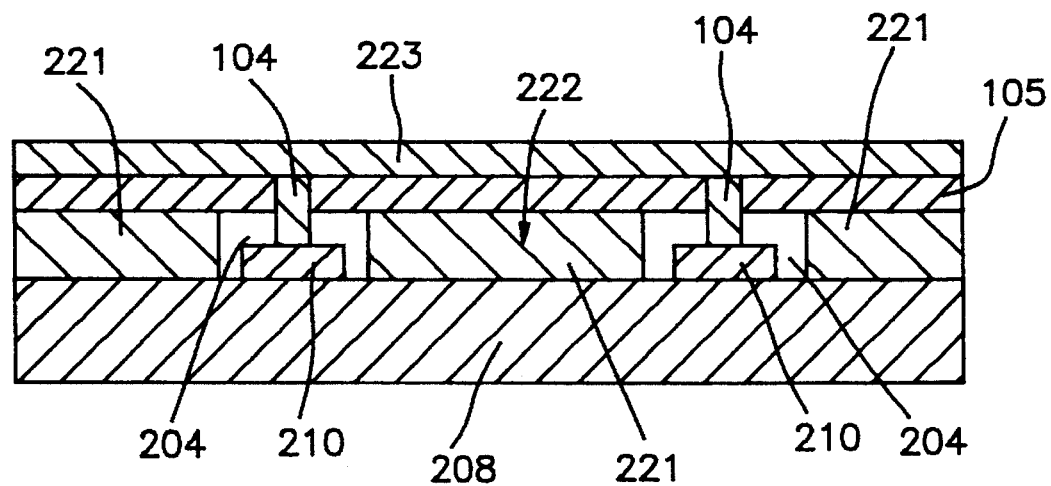

Subsequently, as shown in FIG. 3E, a second thin film layer 223, made of an electrically conducting material, e.g., Pt, and having a thickness of 0.7~2 μm, is formed on top of the first supporting layer 222 using a sputtering method. The second thin film layer 223 is electrically connected to the M×N transistors through the conduit 104 formed in each of the supporting members 204.

Figure 3F:
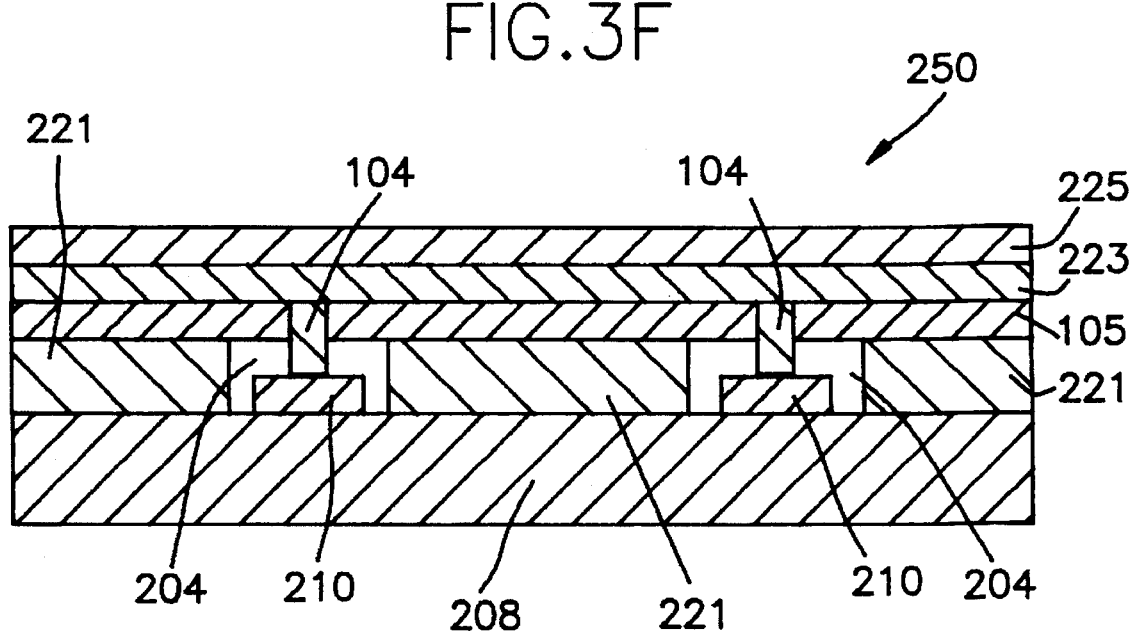

Thereafter, as shown in FIG. 3F, a thin film electrodisplacive layer 225, made of a piezoelectric material, e.g., PZT, or an electrostrictive material, e.g., PMN, and having a thickness of 0.7~2 μm, is formed on top of the second thin film layer 223 using a sol-gel method or a sputtering method to thereby form a semifinished actuating structure 250.

Figure 3G:
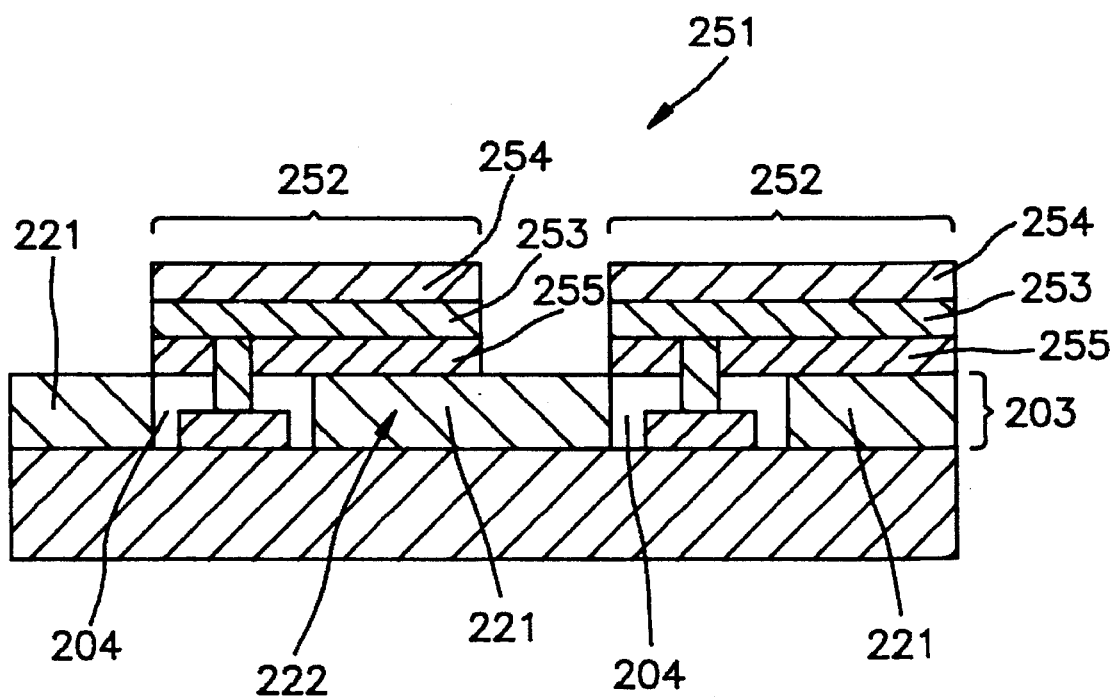

In the ensuing step, as depicted in FIG. 3G, the elastic layer 105, the second thin film layer 223 and the thin film electrodisplacive 225 of the semifinished actuating structure 250 are patterned using a photolithography method or a laser trimming method until the first supporting layer 222, including the array 203 of M×N supporting members 204 and the sacrificial layer 221, is exposed to thereby form an array 251 of M×N semifinished actuated mirror structures 252, wherein each of the semifinished actuated mirror structures 252 includes an electrodisplacive layer 254, a second electrode layer 253 and an elastic member 255.

Thereafter the electrodisplacive layer 254 in each of the semifinished actuated mirror structures 252 is heat treated at 600° C. to 800° C. to allow a phase transition to take place. Since the electrodsiplacive layer 254 in each of semifinished actuated mirror structures is sufficiently thin and small dimensionally, there is no need to pole it in case if it is made of a piezoelectric material; it can be poled with the electrical signal applied during the operation of the corresponding actuated mirror 201.

Figure 3H:
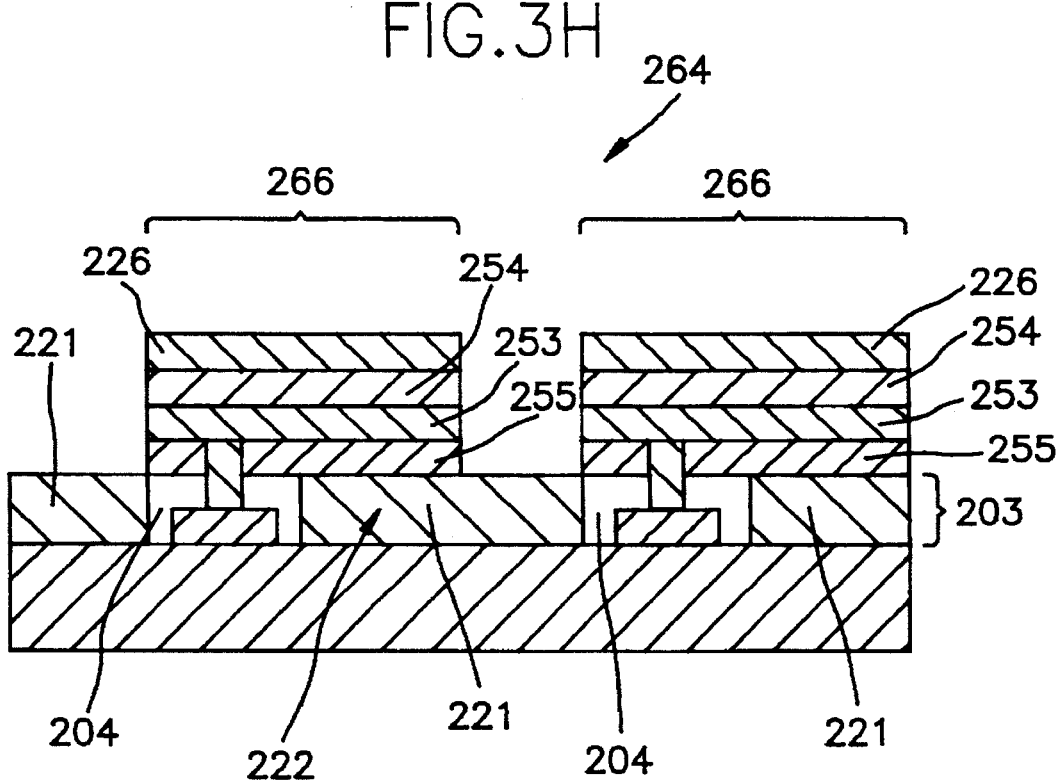

In the ensuing step, as depicted in FIG. 3H, a first thin film layer 226 made of an electrically conducting and light reflecting material, e.g., Ag, and having a thickness of 500 Å to 2000 Å, is formed on top of the electrodisplacive layer 254 in each of the semifinished actuated mirror structures 252 using a sputtering method, resulting in an array 264 of M×N actuated mirror structures 266, wherein each of the actuated mirror structures 266 includes a top and four side surfaces.

Figure 3I:
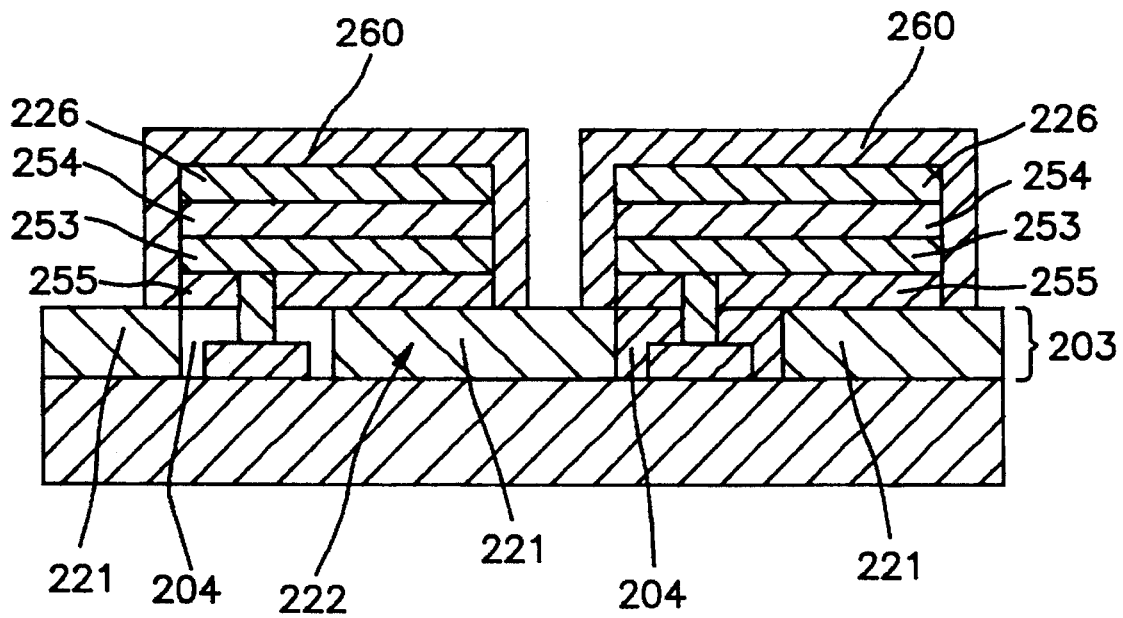

In the following step, the top and the four side surfaces in each of the actuated mirror structures 266 are completely covered with a thin film protection layer 260 made of $SiO_2$ or $Si_3N_4$, as shown in FIG. 3I to thereby form an array 267 of M×N protected actuated mirror structures 268.

Figure 3J:
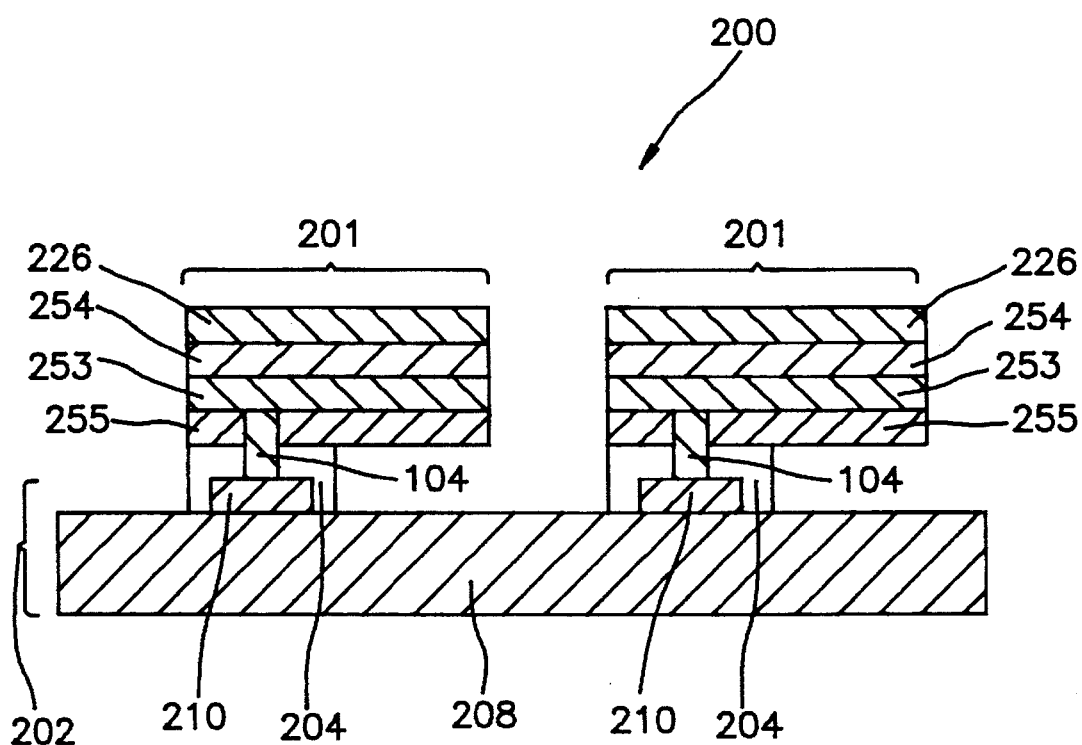

The sacrificial layer 221 of the first supporting layer 222 is then removed using an etching method to form the array 200 of M×N thin film actuated mirrors 201, as shown in FIG. 3J. The thin film protection lyaer 250 covering the top and the four side surfaces in each of the protected actuated mirror structures 268 prevents the etchant from attacking other thin film layers constituting each of the actuated mirror structures 268 thereby preserving the integrity thereof.

While the present invention has been described with respect to certain preferred embodiments only, other modifications and variations may be made without departing from the scope of the present invention as set forth in the following claims.

What is claimed is:

1. A method for manufacturing an array of M×N thin film actuated mirrors, wherein M and N are integers, said method comprising the steps of:

(a) providing an active matrix having a top surface, the active matrix including a substrate, an array of M×N pairs of connecting terminals on the top surface thereof;

(b) forming a sacrificial layer on the top surface of the active matrix in such a way that the sacrificial layer completely covers the array of M×N pairs of connecting terminals;

(c) removing portions of the sacrificial layer surrounding each pair of the connecting terminals;

(d) forming a supporting member around each of connecting terminals by filling the portions with an insulating material;

(e) depositing an elastic layer, made of an insulating material, on top of the sacrificial layer including the supporting members;

(f) forming a conduit in each of the supporting members, each of the conduits extending from top of the elastic layer to each of the connecting terminals;

(g) depositing a second thin film layer made of an electrically conducting material on top of the elastic layer;

(h) forming an electrodisplacive layer on top of the second thin film layer to thereby form a semifinished actuating structure;

(i) patterning the elastic layer, the second layer and the electrodisplacive layer of the semifinished actuating structure until the sacrificial layer is exposed to thereby form an array of M×N semifinished actuated mirror structures, wherein each of the semifinished actuated mirror structures includes an electrodisplacive layer, a second electrode layer and an elastic member;

(j) heat treating the array of M×N semifinished actuated mirror structures to thereby force a phase transition to take place in the electrodisplacive layer in each of the semifinished actuated mirror structures;

(k) depositing a first thin film layer made of an electrically conducting and light reflecting material on each of the semifinished actuated mirror structures to form an array of M×N actuated mirror structures, wherein each of the actuated mirror structures includes a top and four side surfaces;

(l) covering completely each of the actuated mirror structures with a thin film protection layer to thereby form an array of M×N protected actuated mirror structures; and (m) removing the thin film protection layer on the four side surfaces in each of the protected actuated mirror structures and the sacrificial layer to thereby form said array of M×N thin film actuated mirrors.

2. The method of claim 1, wherein the sacrificial layer is formed by using a sputtering method if the sacrificial layer is made of a metal, a chemical vapor deposition method if the sacrificial layer is made of a phosphor-silicate glass, or a spin coating method if the sacrificial layer is made of a poli-Si.

3. The method of claim 1, wherein the second thin film layer is formed by using a sputtering method.

4. The method of claim 1, wherein the thin film electrodisplacive layer is formed by using a sol-gel method or a sputtering method.

5. The method of claim 1, where the first thin film layer is formed by using a sputtering method or a vacuum evaporation method.

6. The method of claim 1, wherein the semifinished actuating structure is patterned using a photolithography method or a laser trimming method.

7. The method of claim 1, wherein the sacrificial layer is removed by an etching method.

8. An optical projection system comprising an array of M×N thin film actuated mirrors prepared in accordance with the method recited in any one of claims 1 to 7.

* * * * *